United States Patent
Yano et al.

(10) Patent No.: US 8,471,692 B2
(45) Date of Patent: Jun. 25, 2013

(54) DRIVING SUPPORT SYSTEM, DRIVING SUPPORT APPARATUS, METHOD, AND COMPUTER-READABLE MEDIUM

(75) Inventors: Katsutoshi Yano, Kawasaki (JP); Jun Kawai, Kawasaki (JP); Toshiaki Gomi, Kawasaki (JP); Hiroshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 519 days.

(21) Appl. No.: 12/845,076

(22) Filed: Jul. 28, 2010

(65) Prior Publication Data
US 2011/0025483 A1 Feb. 3, 2011

(30) Foreign Application Priority Data
Jul. 31, 2009 (JP) ................................. 2009-178927

(51) Int. Cl.
*B60Q 1/00* (2006.01)

(52) U.S. Cl.
USPC ............................ 340/436; 340/435; 701/301

(58) Field of Classification Search
USPC ............................ 340/436, 435, 438; 701/301
See application file for complete search history.

(56) References Cited

U.S. PATENT DOCUMENTS

| 6,958,770 B2 * | 10/2005 | Okada et al. ................. 348/149 |
| 7,920,056 B2 * | 4/2011 | Hattori et al. ................. 340/441 |
| 7,925,441 B2 * | 4/2011 | Maemura et al. ............. 701/301 |

FOREIGN PATENT DOCUMENTS

| JP | 2000-283771 | 10/2000 |
| JP | 2008-65483 | 3/2008 |

* cited by examiner

*Primary Examiner* — Toan N Pham
(74) *Attorney, Agent, or Firm* — Staas & Halsey LLP

(57) ABSTRACT

A driving support system includes an image pickup apparatus captures an image of a periphery of a vehicle in which the image pickup apparatus is provided, a measurement apparatus measures a distance from the vehicle to an obstacle around the vehicle, a driving support apparatus, which includes a determination unit determines a driving danger level of a driver of the vehicle based on the distance, an image enlargement unit changes a size of a simulated image of the vehicle stored in advance based on a result of determination, and an image generation unit combines the image of the periphery of the vehicle and the simulated image of the vehicle changed by the image enlargement unit, and a display apparatus displays the image combined by the image generation unit.

17 Claims, 20 Drawing Sheets

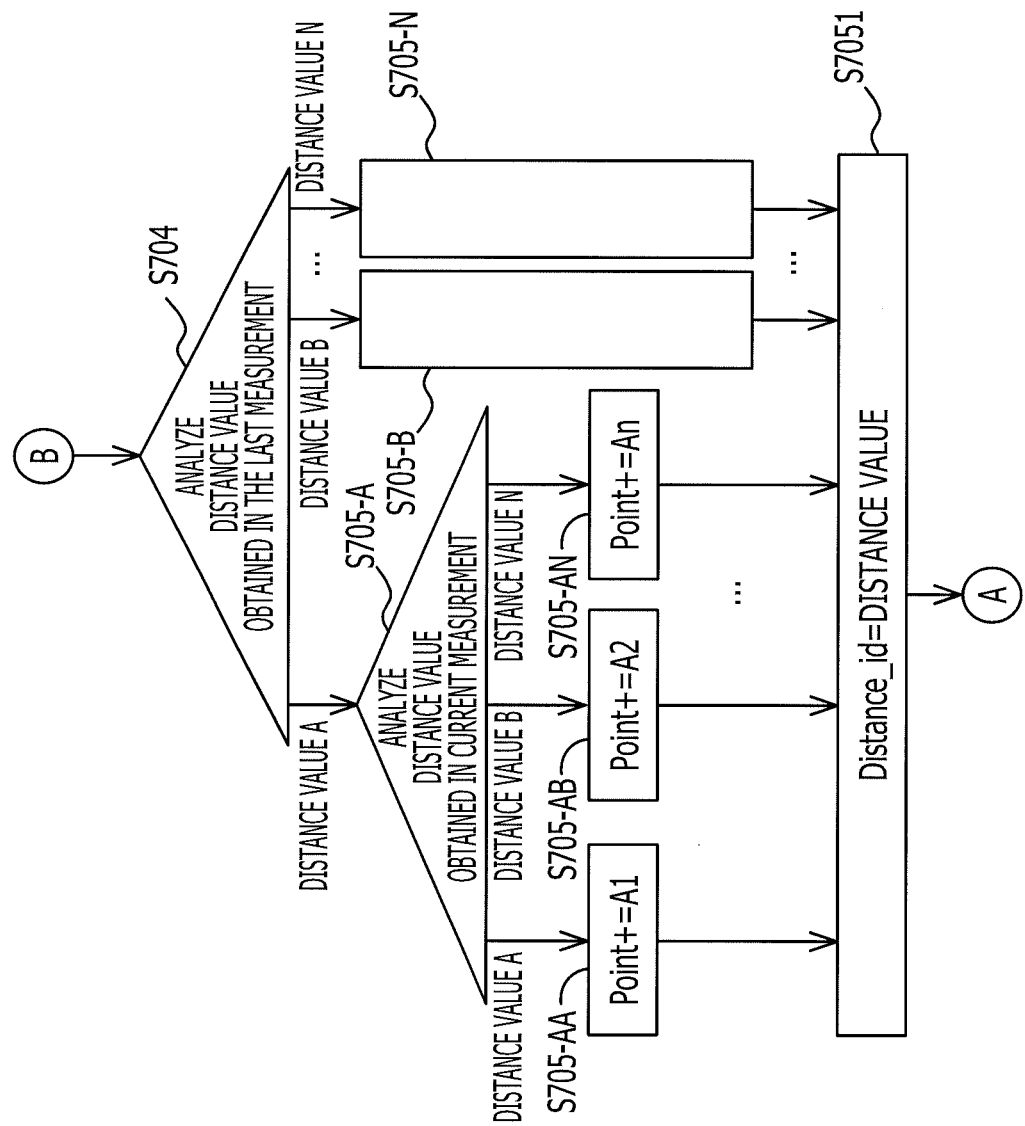

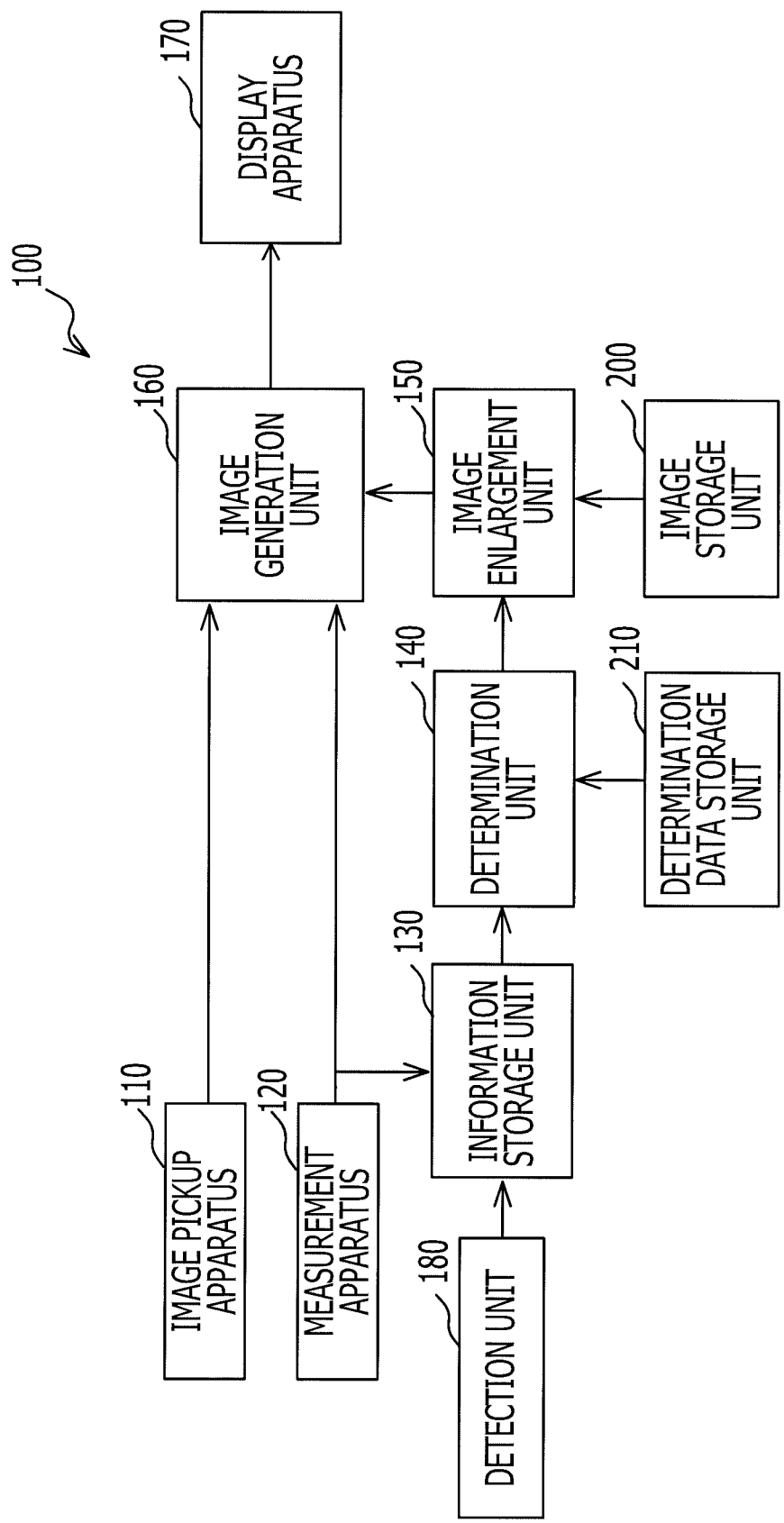

FIG. 10

| DISTANCE VALUE OBTAINED IN CURRENT MEASUREMENT | ENLARGEMENT FACTOR | DISTANCE VALUE OBTAINED IN THE LAST MEASUREMENT | | | |
|---|---|---|---|---|---|
| | | DISTANCE VALUE (x-1)A | DISTANCE VALUE (x-1)B | ... | DISTANCE VALUE (x-1)N |
| DISTANCE VALUE xA | DRIVING INFORMATION CONDITION a | ADDITION NUMBER Aa1 | ADDITION NUMBER Aa2 | ... | ADDITION NUMBER Aan |
| | DRIVING INFORMATION CONDITION b | ADDITION NUMBER Ab1 | ADDITION NUMBER Ab2 | ... | ADDITION NUMBER Abn |
| | ... | ... | ... | ... | ... |
| | DRIVING INFORMATION CONDITION n | ADDITION NUMBER An1 | ADDITION NUMBER An2 | ... | ADDITION NUMBER Ann |
| DISTANCE VALUE xB | DRIVING INFORMATION CONDITION a | ADDITION NUMBER Ba1 | ADDITION NUMBER Ba2 | ... | ADDITION NUMBER Ban |
| | DRIVING INFORMATION CONDITION b | ADDITION NUMBER Bb1 | ADDITION NUMBER Bb2 | ... | ADDITION NUMBER Bbn |
| | ... | ... | ... | ... | ... |
| | DRIVING INFORMATION CONDITION n | ADDITION NUMBER Bn1 | ADDITION NUMBER Bn2 | ... | ADDITION NUMBER Bnn |
| ... | ... | ... | ... | ... | |
| DISTANCE VALUE xN | DRIVING INFORMATION CONDITION a | ADDITION NUMBER Na1 | ADDITION NUMBER Na2 | ... | ADDITION NUMBER Nan |
| | DRIVING INFORMATION CONDITION b | ADDITION NUMBER Nb1 | ADDITION NUMBER Nb2 | ... | ADDITION NUMBER Nbn |
| | ... | ... | ... | ... | ... |
| | DRIVING INFORMATION CONDITION n | ADDITION NUMBER Nn1 | ADDITION NUMBER Nn2 | ... | ADDITION NUMBER Nnn |

1000

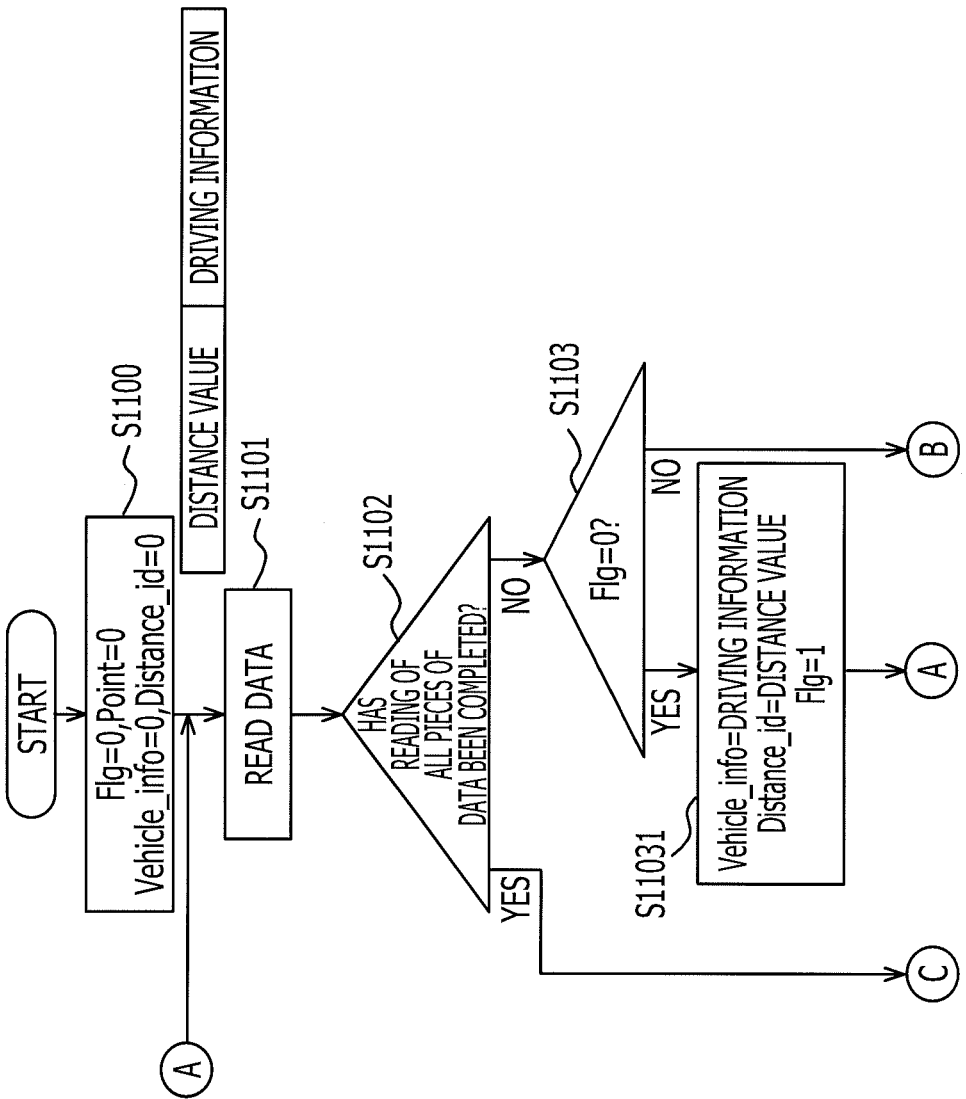

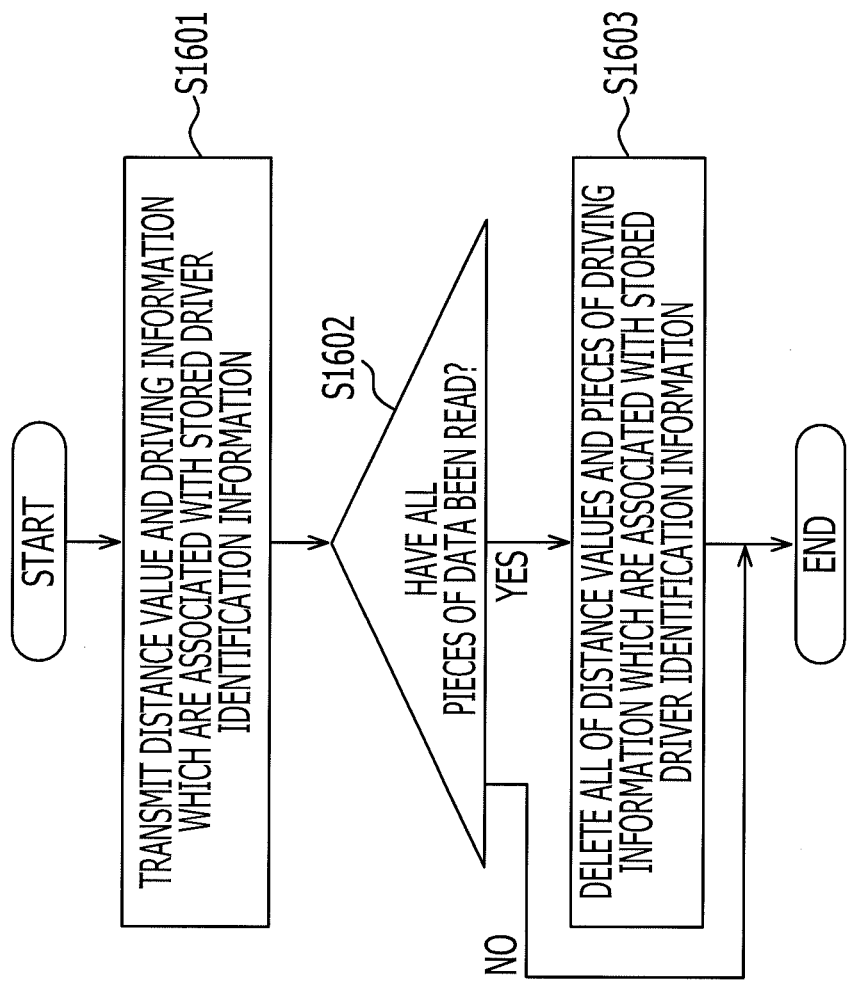

DRIVING SUPPORT SYSTEM, DRIVING SUPPORT APPARATUS, METHOD, AND COMPUTER-READABLE MEDIUM

CROSS-REFERENCE TO RELATED APPLICATIONS

This application is based upon and claims the benefit of priority of the prior Japanese Patent Application No. 2009-178927, filed on Jul. 31, 2009, the entire contents of which are incorporated herein by reference.

FIELD

Various embodiments described herein relate to a technique for supporting driving.

BACKGROUND

Techniques for supporting a driving operation such as parking performed by a driver and reducing the workload of the driver are adopted in vehicles. As one of the techniques, a system for displaying an image including the image of a vehicle and the image of the periphery of the vehicle is known.

For example, there is a system for combining images captured by front, rear, left, and right cameras of a vehicle, superimposing the combined image and a simulated image of the vehicle, and displaying the superimposed image on a monitor as an image obtained when the vehicle is viewed from above. This system can also cooperatively operate with clearance sonars disposed at the four corners of the vehicle, superimpose an image on the image displayed on the monitor on the basis of information acquired by the clearance sonars, and display the superimposed image. In this system, a method of notifying a driver of danger is proposed.

For example, Japanese Laid-Open Patent Application Publication No. 2000-283771 discuses techniques of determining a driving danger level on the basis of vehicle information such as information about acceleration or information about the amount of change in the movement of a steering, superimposing an image based on a result of the determination of the driving danger level on a monitor image, and displaying the superimposed image. Japanese Laid-Open Patent Application Publication No. 2008-65483 discuses techniques of determining a probability that a user's own vehicle and another vehicle will collide by calculating positions these vehicles reach X seconds later on the basis of pieces of information about these vehicles, superimposing an image based on a result of the determination on a monitor image, and displaying the superimposed image.

SUMMARY

A driving support system includes: an image pickup apparatus captures an image of a periphery of a vehicle in which the image pickup apparatus is provided; a measurement apparatus measures a distance from the vehicle to an obstacle around the vehicle; a driving support apparatus which includes a determination unit determines a driving danger level of a driver of the vehicle based on the distance, an image enlargement unit changes a size of a simulated image of the vehicle stored in advance based on a result of determination, and an image generation unit combines the image of the periphery of the vehicle and the simulated image of the vehicle changed by the image enlargement unit; and a display apparatus displays the image combined by the image generation unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7B is a flowchart illustrating the operation of a driving support system according to the first embodiment;

FIG. 8 is a block diagram illustrating the entire configuration of a driving support system according to a second embodiment;

FIG. 10 is a diagram illustrating an example of data in a danger level addition table;

FIG. 11A is a flowchart illustrating the operation of a driving support system according to the second embodiment;

FIG. 16 is a flowchart illustrating the information transmission and deletion operation of an information storage unit.

DESCRIPTION OF EMBODIMENTS

Figure 1:
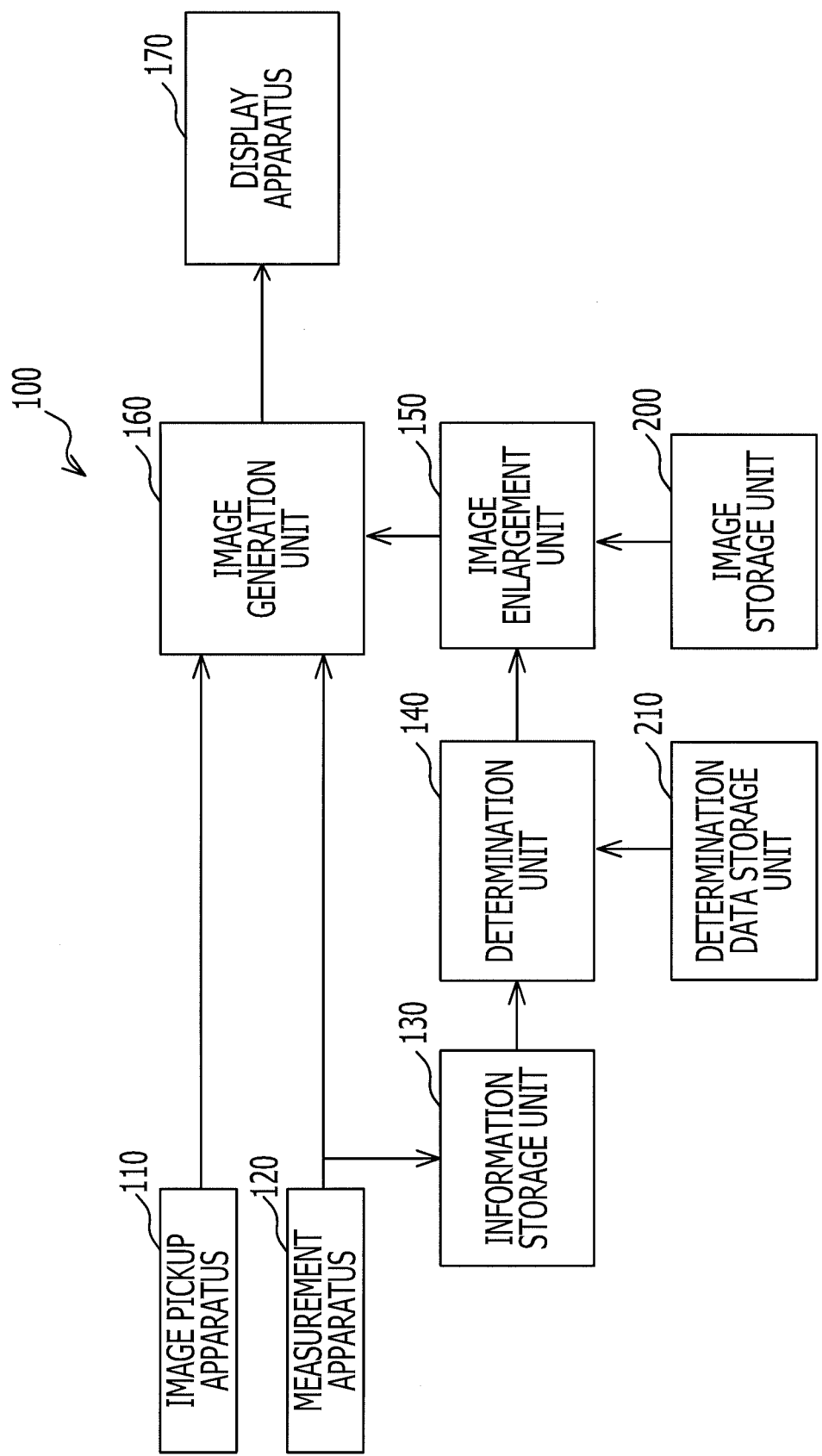
FIG. 1 is a block diagram illustrating the entire configuration of a driving support system according to a first embodiment.

Reference will now be made in detail to the embodiments, examples of which are illustrated in the accompanying drawings, wherein like reference numerals refer to the like elements throughout. The embodiments are described below to explain the present invention by referring to the figures.

The above-described systems in the related art are effective in reducing the workload of a driver and notifying the driver of danger in an out-of-view area. However, when a driver always use such a system and becomes accustomed to a warning generated by the system, the driver may have an erroneous belief on the basis of a past experience or a sense of safety given by the fact that the driver can check an out-of-view area, and perform risky action or a risky operation even if the system notifies the driver of danger.

[First Embodiment]

A driving support system 100 according to the first embodiment will be described below with reference to the accompanying drawings.

FIG. 1 is a block diagram illustrating the entire configuration of the driving support system 100 according to the first embodiment. Referring to FIG. 1, the driving support system 100 includes an image pickup apparatus 110, a measurement apparatus 120, an information storage unit 130, a determination unit 140, an image enlargement unit 150, an image generation unit 160, a display apparatus 170, an image storage unit 200, and a determination data storage unit 210. The information storage unit 130, the determination unit 140, the image enlargement unit 150, the image generation unit 160, the image storage unit 200, and the determination data storage unit 210 may be included in a driving support apparatus.

Figure 2:
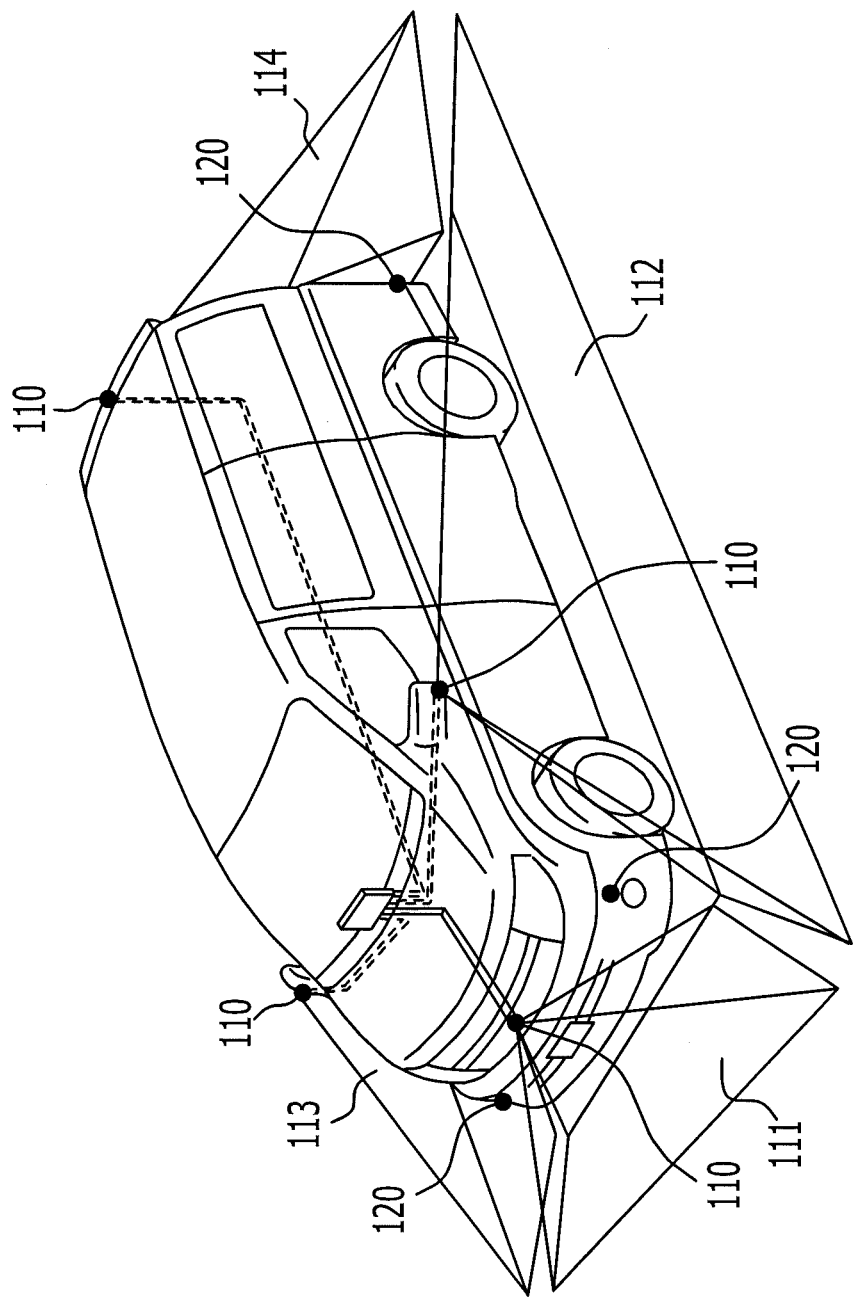
FIG. 2 is a schematic diagram illustrating the configurations of an image pickup apparatus and a measurement apparatus.

The image pickup apparatus 110 captures the image of the periphery of a vehicle, and includes, for example, four cameras, front, rear, left, and right cameras as illustrated in FIG. 2. The front, left, right, and rear cameras capture the images of a front area 111, a side area 112, a side area 113, and a rear area 114, respectively.

The measurement apparatus 120 measures the distance from a vehicle to an obstacle around the vehicle. The measurement apparatus 120 is, for example, a clearance sonar disposed at four corners of a vehicle as illustrated in FIG. 2, and may be an infrared sensor or a millimeter-wave radar. The measurement apparatus 120 periodically transmits information to the information storage unit 130.

Figure 3:
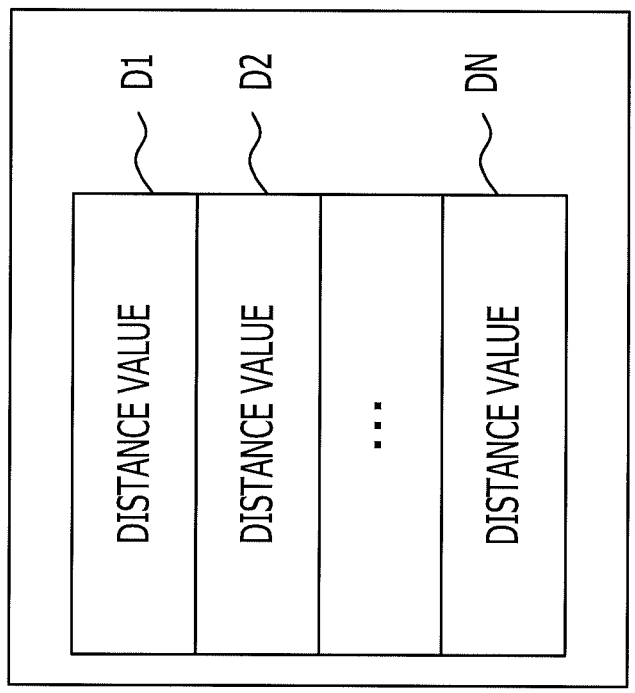
FIG. 3 is a diagram illustrating an example of data stored in an information storage unit.
Figure 4:
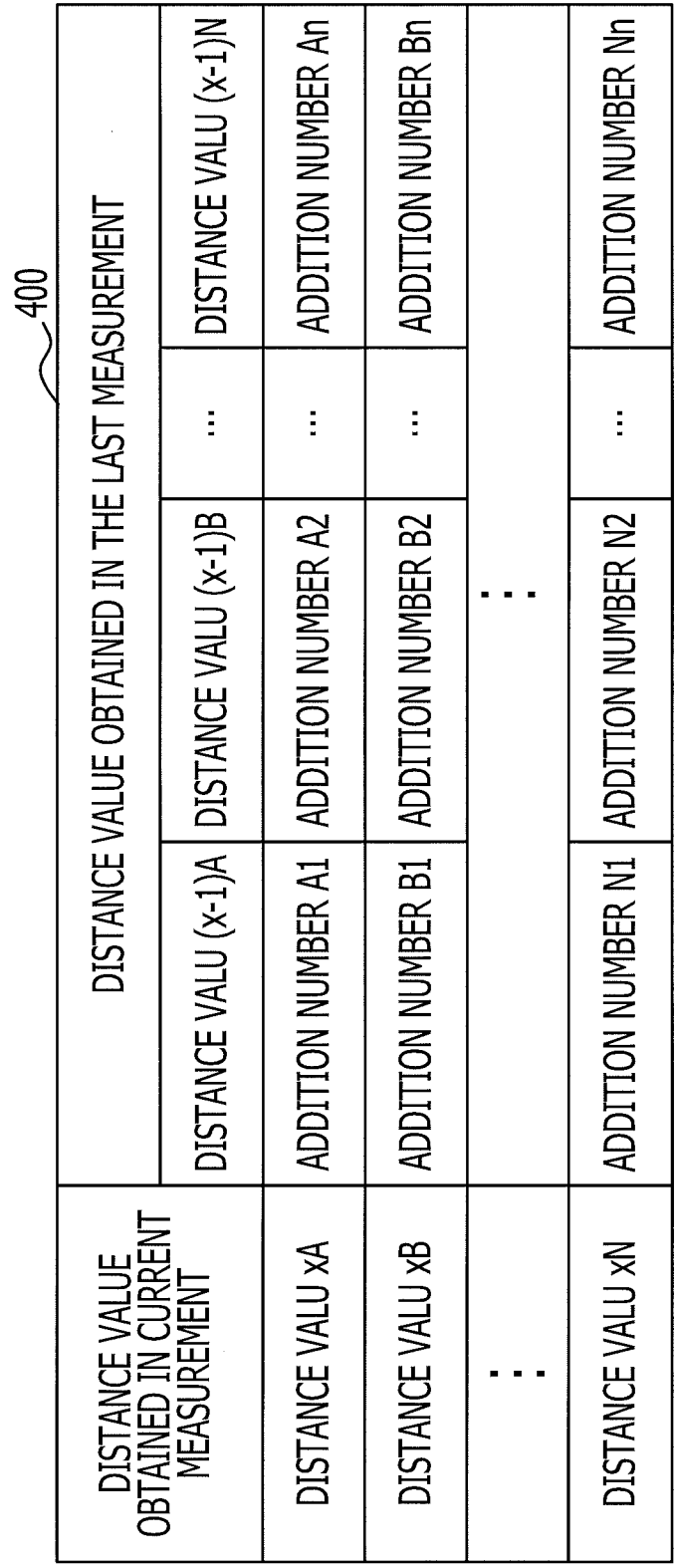
FIG. 4 is a diagram illustrating an example of data in a danger level addition table.

The information storage unit 130 stores values representing the distances from the vehicle to the obstacle measured by the measurement apparatus 120 in chronological order of measurement. As illustrated in FIG. 3, for example, the information storage unit 130 sequentially stores distance values D1, D2, and DN in order of measurement. The information storage unit 130 is, for example, a RAM, a ROM, or an HDD. Furthermore, the information storage unit 130 stores, a danger level addition number table 400 illustrated in FIG. 4. In the danger level addition number table 400, a distance value representing the distance from a vehicle to an obstacle and an addition number used for calculation of a danger level are associated with each other. In columns and rows in the danger level addition number table 400, as the distance values, assumed values in a predetermined unit are stored in advance. For example, when the distance from a vehicle to an obstacle can be measured in centimeters, discrete values of 30 cm and 60 cm are stored as a distance value A and a distance value B, respectively. As the distance value, a value obtained by converting a distance may be stored.

The determination unit 140 refers to the danger level addition number table 400, reads an addition number associated with a distance value, and determines the driving danger level of a driver using the addition number.

In an exemplary case, on the basis of distance values representing distances from a vehicle to an obstacle which have been measured in chronological order, the determination unit 140 refers to the danger level addition number table 400 in which a distance value is associated with an addition number. The determination unit 140 reads out an addition number corresponding to a distance value obtained in certain measurement from the danger level addition number table 400 and adds the read addition number to an addition number corresponding to a distance value obtained in measurement prior to the certain measurement so as to calculate a cumulative danger level index. For example, it is assumed that 50 cm, 40 cm, and 25 cm are stored as the distance values D1, D2, and D3 illustrated in FIG. 3, respectively, and 30 cm and 60 cm are stored as the distance values A and B, respectively, in the danger level addition number table 400 illustrated in FIG. 4. In this case, on the basis of the value of 50 cm obtained in the first measurement, the determination unit 140 refers to the column of "distance value obtained in the last measurement" in the danger level addition number table 400. Since the condition of 30<50<60 is satisfied, the determination unit 140 determines that the value of 50 cm corresponds to a distance value (x−1)B. Subsequently, on the basis of the value of 40 cm obtained in the second measurement, the determination unit 140 refers to the column of "distance value obtained in current measurement" in the danger level addition number table 400. Since the condition of 30<40<60 is satisfied, the determination unit 140 determines that the value of 40 cm corresponds to a distance value xB. The determination unit 140 obtains an addition number B2 at the intersection of the distance value (x−1)B and the distance value xB. Subsequently, on the basis of the value of 40 cm obtained in the second measurement, the determination unit 140 refers to the column of "distance value obtained in the last measurement". Since the condition of 30<40<60 is satisfied, the determination unit 140 determines that the value of 40 cm corresponds to the distance value (x−1)B. Subsequently, on the basis of the value of 25 cm obtained in the third measurement, the determination unit 140 refers to the column of "distance value obtained in current measurement". Since the condition of 25<30 is satisfied, the determination unit 140 determines that the value of 25 cm corresponds to a distance value xA. The determination unit 140 obtains an addition number A2 at the intersection of the distance value (x−1)B and the distance value xA. Subsequently, the determination unit 140 calculates a cumulative danger level index by adding the addition number A2 to the addition number B2, and determines the driving danger level of a driver by comparing the cumulative danger level index with a danger level determination threshold value stored in the information storage unit 130. A plurality of danger level determination threshold values can be set. For example, by setting three danger level determination threshold values, four driving danger levels, "safety level", "low danger level", "intermediate danger level", and "high danger level", can be obtained as results of determination. In this example, although a danger level is determined on the basis of a distance value representing the distance from a vehicle to an obstacle, the distance itself may be set as a danger level.

In the above-described driving support system, the information storage unit 130 may associate information about the distance to an obstacle and a danger level index with each other and store them. The determination unit 140 may read the danger level index associated with the information about the distance to an obstacle obtained by measurement from the information storage unit 130 and determine the driving danger level of a driver with the danger level index and a danger level determination threshold value stored in the determination data storage unit 210.

According to the above-described configuration, since a driving danger level is determined with a danger level index based on the distance from a vehicle to an obstacle, it is possible to more accurately determine the driving danger level.

In the above-described driving support system, the information storage unit 130 may associate each of values representing the distances to an obstacle which have been chronologically measured and a danger level index with each other. The determination unit 140 may refer to the information storage unit 130, calculate a cumulative danger level index by adding a danger level index corresponding to one of the values representing the distances to an obstacle which has been obtained in certain measurement to a danger level index corresponding to another one of the values representing the distances to an obstacle which has been obtained in measurement prior to the certain measurement, and determine the driving danger level of a driver by comparing the calculated cumulative danger level index with a danger level determination threshold value.

According to the above-described configuration, since a driving danger level is determined with a cumulative danger level index calculated from a plurality of values representing the distances from a vehicle to an obstacle which have been obtained by chronological measurement, it is possible to more accurately determine a driving danger level.

Figure 5:
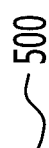
FIG. 5 is a diagram illustrating an example of data in an image enlargement criteria table.

The image enlargement unit 150 enlarges a simulated image of a vehicle on the basis of a result of the determination of a driving danger level. The image enlargement unit 150 refers to, for example, an image enlargement criteria table 500 illustrated in FIG. 5. In the image enlargement criteria table 500, a determination result is associated with an enlargement factor. The image enlargement unit 150 reads out an enlargement factor corresponding to a driving danger level that is a result of determination from the image enlargement criteria table 500 and enlarges a simulated image of a vehicle stored in the image storage unit 200 at the read enlargement factor.

Figure 6A:
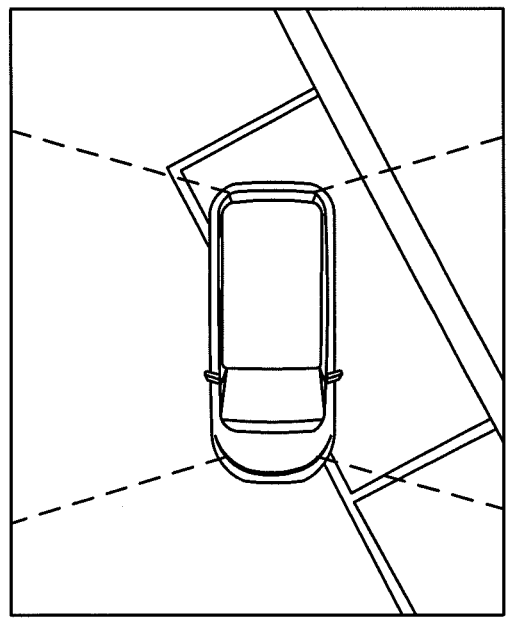
FIGS. 6A and 6B each illustrate an example of a monitor image.
Figure 6B:
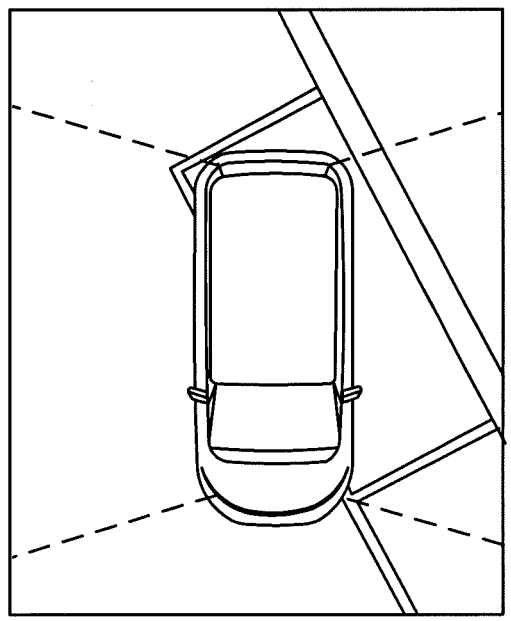

The image generation unit 160 superimposes an image transmitted from the image pickup apparatus 110 and an image transmitted from the image enlargement unit 150 so as to generate an image illustrated in FIG. 6B in which a vehicle is viewed from above. The image transmitted from the image pickup apparatus 110 is generated in such a manner that the image pickup apparatus 110 captures the image of the periphery of a user's own vehicle and performs image processing upon the captured image. The image transmitted from the image enlargement unit 150 is generated in such a manner that the image enlargement unit 150 enlarges the simulated image of a vehicle. FIG. 6A illustrates an example of an image obtained before enlargement. FIG. 6B illustrates an example of an image obtained after enlargement. The display apparatus 170 is, for example, a liquid crystal display or an organic electroluminescent display for displaying an image generated by the image generation unit 160, and may be a display apparatus for a car navigation system provided in a vehicle. An image obtained by combining the image in which the vehicle is viewed from above and the image of an obstacle detected by a clearance sonar may be displayed. For example, by disposing clearance sonars at four corners of a vehicle so as to eliminate blind spots, an obstacle around the vehicle can be detected. By combining an image obtained by causing a plurality of cameras of the vehicle to capture the obstacle detected by a clearance sonar and the simulated image of the vehicle, it is possible to generate an image including the image of the obstacle. The image enlargement unit 150 may partially enlarge the simulated image of a vehicle. For example, when a clearance sonar disposed at the left rear corner of a vehicle detects an obstacle, the image enlargement unit 150 may enlarge only a part of the simulated image of the vehicle corresponding to the left rear side of the vehicle at an enlargement factor corresponding to a driving danger level without enlarging the other part of the simulated image of the vehicle so as to generate a vehicle image. The image generation unit 160 may generate an overhead image including the vehicle image in which only a part of the vehicle is enlarged and the image of the obstacle.

Figure 7A:
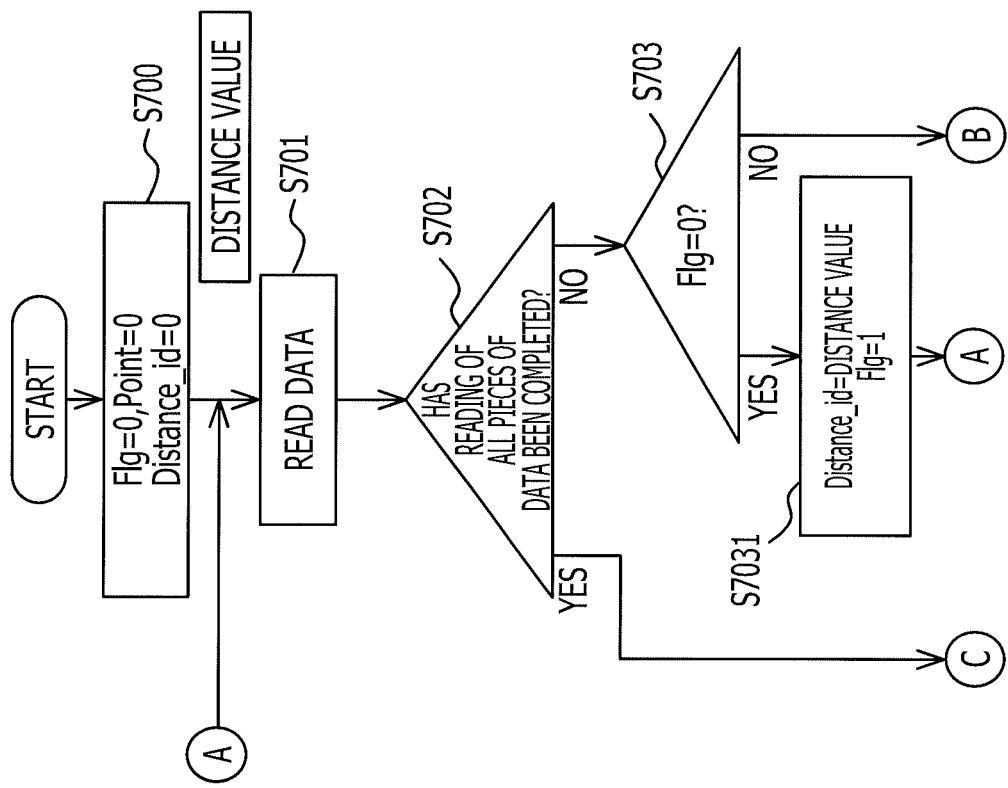
FIG. 7A is a flowchart illustrating the operation of a driving support system according to the first embodiment.
Figure 7C:
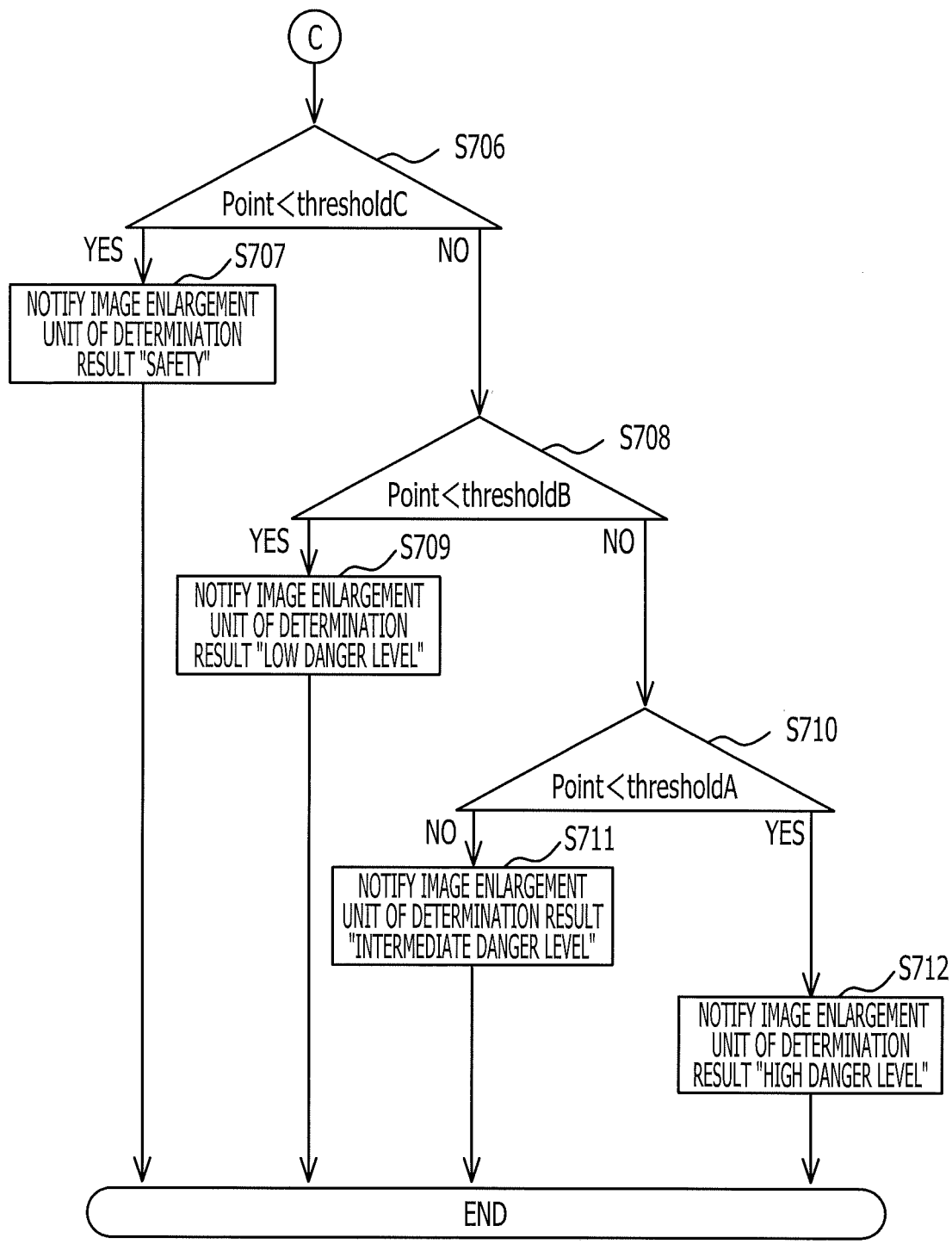
FIG. 7C is a flowchart illustrating the operation of a driving support system according to the first embodiment.

The operation of the driving support system 100 according to the first embodiment will be described below with reference to a flowchart illustrated in FIGS. 7A, 7B, and 7C.

First, in step S700, the determination unit 140 performs initialization by setting a variable Flg representing a determination flag, a variable Point representing a cumulative danger level index, and a variable Distance_id representing the distance to an obstacle obtained in the last measurement to zero.

In step S701, the determination unit 140 reads out a distance value from the information storage unit 130.

In step S702, the determination unit 140 determines whether all pieces of data of distance values stored in the information storage unit 130 have been read.

When it is determined in step S702 that reading of all pieces of data has not been completed, the determination unit 140 determines whether the determination flag Flg is zero in step S703. This operation is performed so as to determine whether the read value is a value obtained by measuring the distance to a certain obstacle in the first measurement.

When it is determined in step S703 that the determination flag Flg is zero, that is, the read value is a value obtained by measuring the distance to a certain obstacle in the first measurement, the determination unit 140 sets the determination flag Flg to one and stores the read value as the variable Distance_id representing the distance to the obstacle obtained in the last measurement in step S7031. Subsequently, the operation of step S701 is performed again. That is, the determination unit 140 reads out a distance value obtained by measuring the distance to the obstacle in the second measurement from the information storage unit 130.

On the other hand, when it is determined in step S703 that the determination flag Flg is not zero, the determination unit 140 analyzes the value stored as the variable Distance_id, that is, the distance value obtained in the last measurement, in step S704. In step S704, for example, it is determined which of the distance values (x−1)A to (x−1)N in the danger level addition number table 400 corresponds to the distance value obtained in the last measurement. On the basis of a result of the determination, the next operation is determined. For example, when the distance value obtained in the last measurement is the distance value A, the operation of step S705-A is performed. When the distance value obtained in the last measurement is the distance value B, the operation of step S705-B is performed. When the distance value obtained in the last measurement is the distance value N, the operation of step S705-N is performed. Steps S705-A, S705-B, and S705-N are sometimes collectively referred to as step S705.

In step S705, the determination unit 140 analyzes the distance value obtained in the current measurement, that is, the value read in step S701. For example, it is determined which of the distance values xA to xN corresponds to the distance value obtained in the current measurement.

On the basis of a result of the determination performed in step S705, the determination unit 140 obtains a danger level addition number. For example, the determination unit 140 can determine an addition number by referring to the danger level addition number table 400 illustrated in FIG. 4 in which an addition number corresponding to a distance value obtained in certain measurement and a distance value obtained in measurement prior to the certain measurement is stored. For example, the determination unit 140 can read out an addition number corresponding to both a distance value (x) that is a value representing the distance to an obstacle obtained in current measurement and a distance value (x−1) obtained in the last measurement from the danger level addition number table 400.

For example, when it is determined in step S704 that the distance value obtained in the last measurement is the distance value A and it is determined in step S705-A that the distance value obtained in current measurement is the distance value A, an addition number A1 is read out from the danger level addition number table 400. The read addition number A1 is added to the variable Point representing the cumulative danger level index in step S705-AA. In steps S705-B to S705-N, the determination unit 140 similarly reads out an addition number corresponding to the distance value (x−1) obtained in the last measurement and the distance value (x) obtained in current measurement from the danger level addition number table 400 and adds the read addition number to the cumulative danger level index. For example, when the distance value obtained in the last measurement is the distance value N and the distance value obtained in current measurement is the distance value N, an addition number Nn is read and is added to the variable Point so as to calculate a cumulative danger level index. The distance value obtained in the current measurement, that is, the value read in step S701, is stored as the variable Distance_id in step S7051.

The process from step S703 to step S7051 is repeatedly performed for all pieces of data stored in the information storage unit 130. After the process has been performed for all pieces of data (Yes in step S702), the determination unit 140 determines whether the cumulative danger level index Point calculated by the addition of addition numbers is smaller than a threshold value C that is a danger level determination threshold value stored in the information storage unit 130 in step S706.

When it is determined in step S706 that the cumulative danger level index Point is smaller than the threshold value C, the determination unit 140 notifies the image enlargement unit 150 of a determination result "safety" and the image enlargement unit 150 enlarges the simulated image of a vehicle at an enlargement factor of 1 in step S707. On the other hand, when it is determined in step S706 that the cumulative danger level index Point is not smaller than the threshold value C, the determination unit 140 determines whether the cumulative danger level index Point is smaller than a threshold value B in step S708.

When it is determined in step S708 that the cumulative danger level index Point is smaller than the threshold value B, the determination unit 140 notifies the image enlargement unit 150 of a determination result "low danger level" and the image enlargement unit 150 enlarges the simulated image of the vehicle at an enlargement factor of 1.05 in step S709. On the other hand, when it is determined in step S708 that the cumulative danger level index Point is not smaller than the threshold value B, the determination unit 140 determines whether the cumulative danger level index Point is smaller than a threshold value A in step S710.

When it is determined in step S710 that the cumulative danger level index Point is smaller than the threshold value A, the determination unit 140 notifies the image enlargement unit 150 of a determination result "intermediate danger level" and the image enlargement unit 150 enlarges the simulated image of the vehicle at an enlargement factor of 1.1 in step S711. On the other hand, when it is determined in step S710 that the cumulative danger level index Point is not smaller than the threshold value A, the determination unit 140 notifies the image enlargement unit 150 of a determination result "high danger level" and the image enlargement unit 150 enlarges the simulated image of the vehicle at an enlargement factor of 1.15 in step S712.

According to the first embodiment, the enlargement factor for the simulated image of a user's own vehicle can be increased with the increase in the danger level. This can provide for a driver an image in which the distance between a vehicle and an obstacle is smaller than the actual distance when a danger level is high. Accordingly, it is possible to provide a driving support system capable of, even if a driver is accustomed to a warning generated by the driving support system, reducing a risk generated by an erroneous belief of the driver based on a past experience or a sense of safety given by the fact that the driver can check an out-of-view area, that is, a risk of believing that a user's own vehicle does no collide against an obstacle because there is a sufficient distance between the vehicle and the obstacle on an image. Furthermore, since a driving danger level is determined with cumulative danger level indices that are chronologically obtained, it is possible to provide a driving support system capable of more accurately reducing a risk generated by an erroneous belief of a driver.

[Second Embodiment]

FIG. 8 is a block diagram illustrating the entire configuration of the driving support system 100 according to the second embodiment. The description of the configuration of the driving support system 100 similar to that described in the first embodiment will be omitted. The driving support system 100 illustrated in FIG. 8 further includes a detection unit 180. The detection unit 180 detects the driving state of a vehicle and transmits driving information about the detected driving state to the information storage unit 130. The detection unit 180 is, for example, a speed sensor for detecting the speed of a vehicle.

Figure 9A:
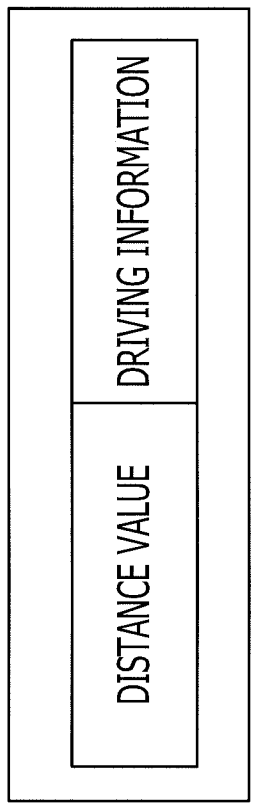
FIG. 9A is a diagram illustrating an exemplary format of data stored in an information storage unit.
Figure 9B:
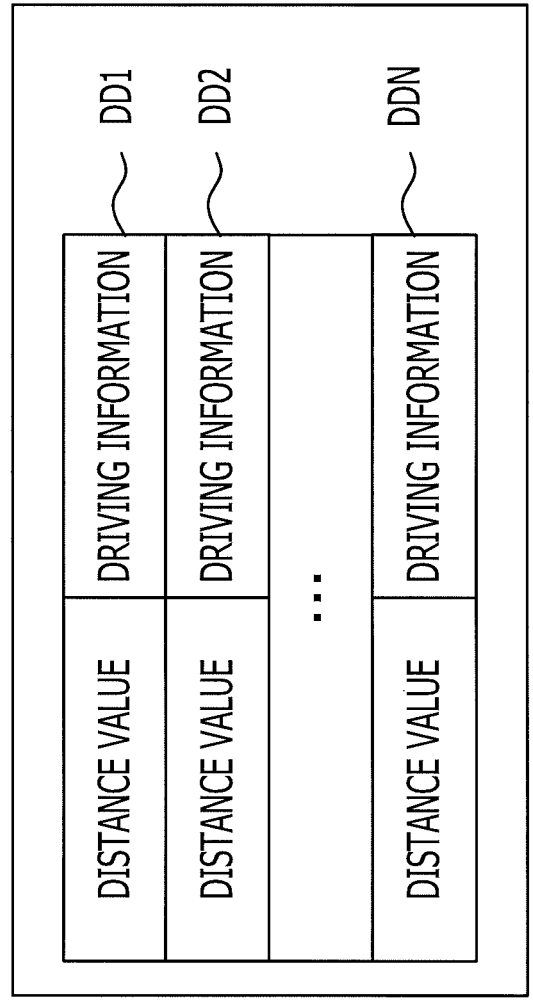
FIG. 9B is a diagram illustrating an example of data stored in the information storage unit.

The information storage unit 130 stores a distance value measured by the measurement apparatus 120 and the driving information detected by the detection unit 180. The information storage unit 130 uses, for example, a data format illustrated in FIG. 9A in which a distance value and driving information are associated with each other in addition to the data format illustrated in FIG. 3. For example, as illustrated in FIG. 9B, the information storage unit 130 stores pieces of data obtained by associating a distance value and driving information with each other in chronological order of measurement. That is, distance values and pieces of driving information are stored so that they are listed in order in which they have been measured for a certain obstacle. For example, the information storage unit 130 stores pieces of data DD1, DD2, . . . and DDN in chronological order each of which is obtained by associating a distance value and driving information with each other. In an example illustrated in FIG. 9B, driving information and a distance value are transmitted from the detection unit 180 and the measurement apparatus 120, respectively, at approximately the same time, and are then stored in the information storage unit 130.

The determination unit 140 refers to, for example, a danger level addition number table 1000 illustrated in FIG. 10, reads out an addition number associated with driving information and a distance value, and determines the driving danger level of a driver with the read addition number. The danger level addition number table 1000 illustrated in FIG. 10 differs from the danger level addition number table 400 illustrated in FIG. 4 in that driving information is used for determination.

The determination unit 140 refers to the danger level addition number table 1000 in which driving information, a distance value, and an addition number are associated with one another on the basis of pieces of driving information acquired in chronological order and distance values acquired in chronological order. The determination unit 140 reads out an addition number corresponding to driving information and a distance value which have been obtained in certain measurement and calculates a cumulative danger level index by adding the read addition number to an addition number corresponding to driving information and a distance value which have been obtained in measurement prior to the certain measurement. The determination unit 140 determines the driving danger level of a driver by comparing the calculated cumulative danger level index with a danger level determination threshold value stored in the information storage unit 130.

In the above-described driving support system, the information storage unit 130 may associate a danger level index with driving information and information about the distance to an obstacle. The driving support system may further include the detection unit 180 for acquiring driving information indicating the driving state of a user's own vehicle. The determination unit 140 may refer to the information storage unit 130, read out a danger level index associated with acquired driving information and acquired information about the distance to an obstacle, and determine the driving danger level of a driver with the read danger level index.

According to the above-described configuration, since a driving danger level is determined with a danger level index that has been acquired on the basis of not only the distance to an obstacle but also the driving state of a user's own vehicle, the driving danger level can be more accurately determined.

In the above-described driving support system, the information storage unit 130 may associate a danger level index with driving information and a value representing the distance to an obstacle. The driving support system may further include the detection unit 180 for acquiring driving information indicating the driving state of a user's own vehicle. The determination unit 140 may refer to the information storage unit 130 on the basis of pieces of driving information that have been chronologically acquired and values representing distances to an obstacle which have been chronologically measured, read out a danger level index corresponding to driving information and a value representing the distance to the obstacle which have been obtained in certain measurement, calculate a cumulative danger level index by adding the read danger level index to a danger level index corresponding to driving information and a value representing the distance to the obstacle which have been obtained in measurement prior to the certain measurement, and determine the driving danger level of a driver by comparing the calculated cumulative danger level index with a danger level determination threshold value.

According to the above-described configuration, since a cumulative danger level index is calculated with values representing the distances to an obstacle which have been measured in chronological order and acquired pieces of driving information and a driving danger level is determined with the calculated cumulative danger level index, the driving danger level can be more accurately determined.

Figure 11B:
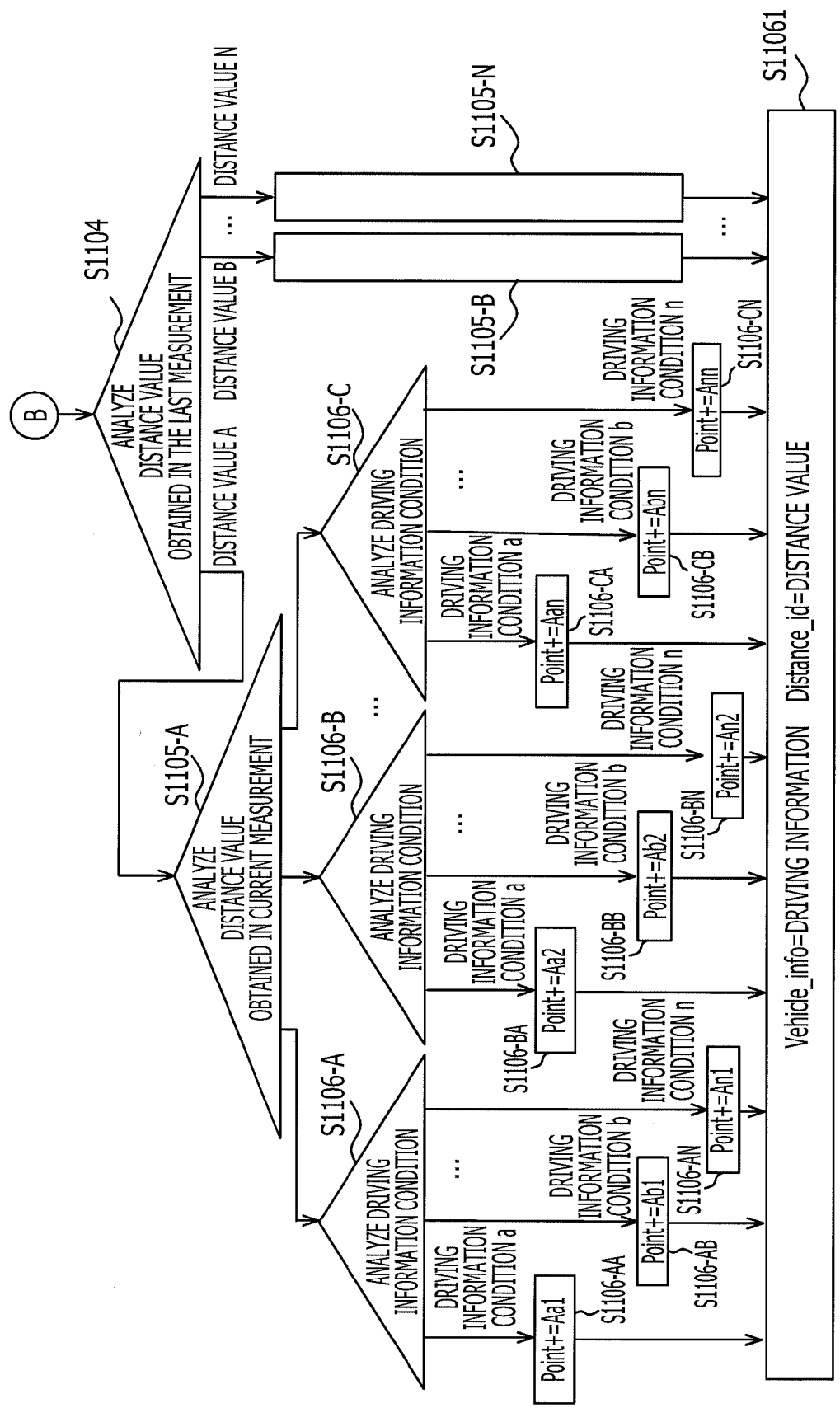
FIG. 11B is a flowchart illustrating the operation of a driving support system according to the second embodiment.
Figure 11C:
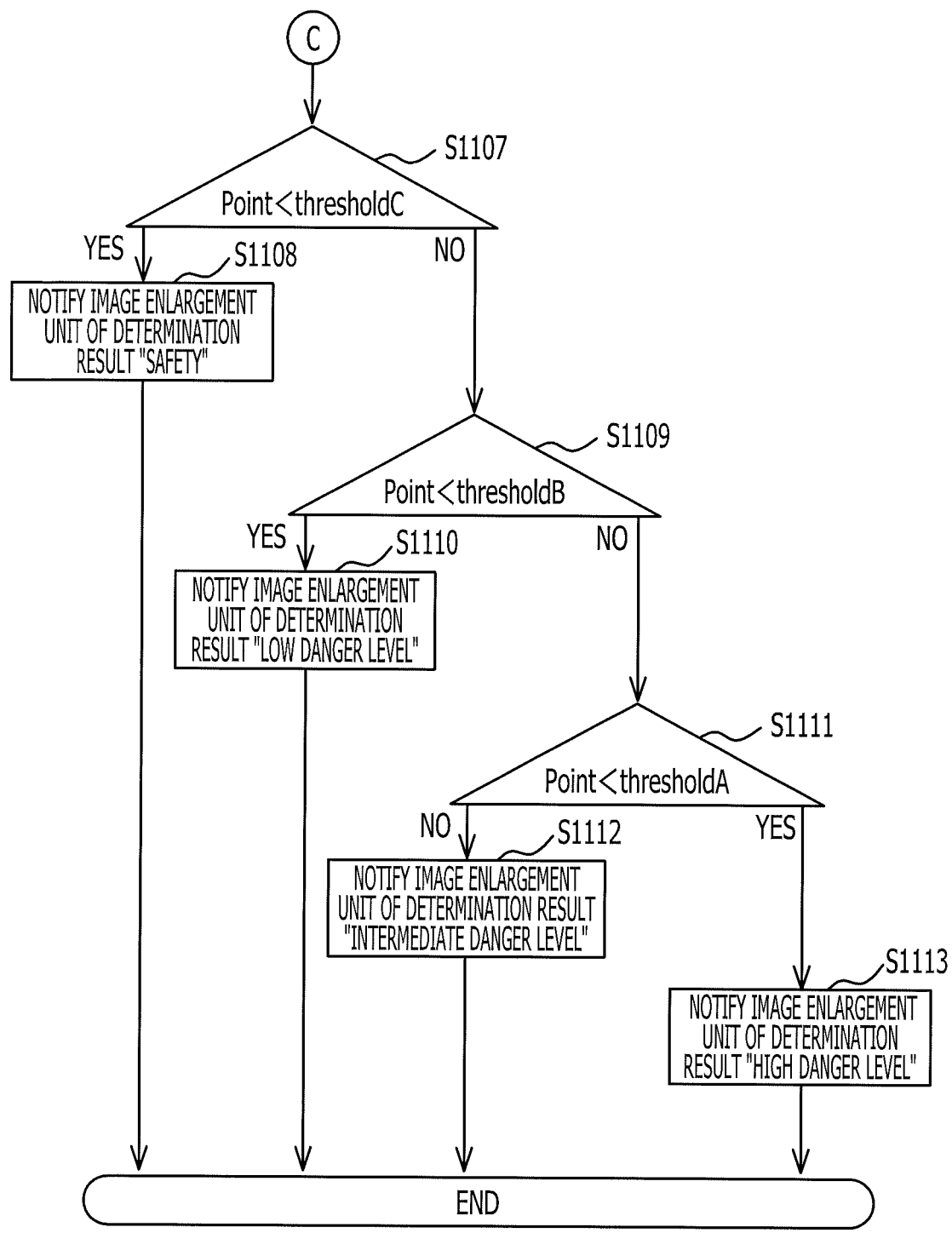
FIG. 11C is a flowchart illustrating the operation of a driving support system according to the second embodiment.

The operation of the driving support system 100 according to the second embodiment will be described below with reference to a flowchart illustrated in FIGS. 11A, 11B, and 11C.

First, in step S1100, the determination unit 140 performs initialization by setting a variable Flg representing a determination flag, a variable Vehicle_info representing driving information obtained in the last measurement, a variable Point representing a cumulative danger level index, and a variable Distance_id representing a distance value obtained in the last measurement to zero.

In step S1101, the determination unit 140 reads out a distance value and driving information from a data table illustrated in FIG. 9B stored in the information storage unit 130.

In step S1102, the determination unit 140 determines whether all pieces of data of distance values and pieces of driving information have been read.

When it is determined in step S1102 that reading of all pieces of data has not been completed, the determination unit 140 determines whether the determination flag Flg is zero in step S1103. This operation is performed so as to determine whether the read value is a value obtained in the first measurement performed for a certain obstacle.

When it is determined in step S1103 that the determination flag Flg is zero, that is, the read value is a value obtained in the first measurement, the determination unit 140 sets the determination flag Flg to one, stores the read value as the variable Distance_id representing a distance value obtained in the last measurement, and stores read driving information as the variable Vehicle_info representing driving information obtained in the last measurement in step S11031. Subsequently, the operation of step S1101 is performed again. On the other hand, when it is determined in step S1103 that the determination flag Flg is not zero, the determination unit 140 analyzes the distance value stored as the variable Distance_id, that is, the distance value obtained in the last measurement, in step S1104.

In step S1104, for example, it is determined which of the distance values A to N corresponds to the distance value obtained in the last measurement. On the basis of a result of the determination, the next operation is determined. For example, when the distance value obtained in the last measurement is the distance value A, the operation of step S1105-A is performed. When the distance value obtained in the last measurement is the distance value B, the operation of step S1105-B is performed. When the distance value obtained in the last measurement is the distance value N, the operation of step S1105-N is performed. Steps S1105-A, S1105-B, and S1105-N are sometimes collectively referred to as step S1105.

In step S1105, the determination unit 140 analyzes the distance value and driving information which have been obtained in the current measurement, that is, the values read in step S1101. For example, in step S1105-A, it is determined which of the distance values A to N corresponds to the distance value obtained in the current measurement. On the basis of a result of the determination, the next operation is determined.

For example, when the distance value obtained in the current measurement is the distance value A, the operation of step S1106-A is performed. When the distance value obtained in the current measurement is the distance value B, the operation of step S1106-B is performed. When the distance value obtained in the current measurement is the distance value N, the operation of step S1106-N is performed. In steps S1106-A to S1106-N, the determination unit 140 analyzes driving information obtained in the current measurement, that is, the driving information read in step S1101. Subsequently, the determination unit 140 obtains an addition number on the basis of a result of the operation of S1106-A and adds the obtained addition number to the cumulative danger level index in step S1106-AA. For example, in step S1106-A, it is determined which of driving information conditions a to n corresponds to the driving information obtained in the current measurement.

The determination unit 140 reads out an addition number corresponding to the driving information condition acquired in step S1106-A from a danger level addition number table. FIG. 10 is a diagram illustrating an example of the danger level addition number table 1000. In the danger level addition number table 1000 illustrated in FIG. 10, an addition number corresponding to a distance value and a driving information condition that has been obtained in certain measurement and a distance value obtained in the last measurement is stored. A distance value is associated with a driving information condition, and an addition number is stored for each driving information condition.

For example, the determination unit 140 can select an addition number corresponding to the distance value(x−1) obtained in the last measurement from among addition numbers corresponding to the distance value (x) representing the distance from a vehicle to an obstacle obtained in the current measurement and a driving information condition for driving information obtained in the current measurement and read the selected addition number from the danger level addition number table 1000. The read addition number is added to the cumulative danger level index Point.

For example, when a distance value obtained in the last measurement is the distance value A, a distance value obtained in the current measurement is the distance value A, and a driving information condition is the driving information condition is a, an addition number Aa1 is added to the cumulative danger level index Point in step S1106-AA. In steps S1105-B to S1105-N, the determination unit 140 similarly reads from the danger level addition number table 1000 an addition number corresponding to the distance value (x−1) obtained in the last measurement, the distance value (x) obtained in the current measurement, and driving information obtained in the current measurement, and adds the read addition number to a cumulative danger level index.

For example, when a distance value obtained in the last measurement is the distance value N, a distance value obtained in the current measurement is the distance value N, and a driving information condition is the driving information condition n, a cumulative danger level index is calculated by adding an addition number Nnn to the last obtained addition number.

Thus, the determination unit 140 can read out an addition number from the danger level addition number table 1000 on the basis of driving information and a distance value which have been obtained in certain measurement and a distance value obtained in the last measurement.

Subsequently, the determination unit 140 can reflect the change in the driving state of a vehicle and the change in the distance to an obstacle in a cumulative danger level index by adding the read addition number to the cumulative danger level index. As a result, it is possible to determine a danger level in consideration of the change in the driving state of a vehicle and the change in the distance to an obstacle. The distance value and the driving information which have been obtained in the current measurement, that is, the values read in step S1101, are stored as the variable Distance_id in step S11061.

The process from step S1103 to step S11061 is repeatedly performed for all pieces of data stored in the information storage unit 130. After the process has been performed for all pieces of data (Yes in step S1102), the determination unit 140 determines whether the cumulative danger level index Point calculated by the addition of addition numbers is smaller than the threshold value C that is a danger level determination threshold value stored in the information storage unit 130 in step S1107.

When it is determined in step S1107 that the cumulative danger level index Point is smaller than the threshold value C, the determination unit 140 notifies the image enlargement unit 150 of a determination result "safety" and the image enlargement unit 150 enlarges the simulated image of a vehicle at an enlargement factor of 1 in step S1108. On the other hand, when it is determined in step S1107 that the cumulative danger level index Point is not smaller than the threshold value C, the determination unit 140 determines whether the cumulative danger level index Point is smaller than the threshold value B in step S1109.

When it is determined in step S1109 that the cumulative danger level index Point is smaller than the threshold value B, the determination unit 140 notifies the image enlargement unit 150 of a determination result "low danger level" and the image enlargement unit 150 enlarges the simulated image of the vehicle at an enlargement factor of 1.05 in step S1110. On the other hand, when it is determined in step S1109 that the cumulative danger level index Point is not smaller than the threshold value B, the determination unit 140 determines whether the cumulative danger level index Point is smaller than the threshold value A in step S1111.

When it is determined in step S1111 that the cumulative danger level index Point is smaller than the threshold value A, the determination unit 140 notifies the image enlargement unit 150 of a determination result "intermediate danger level" and the image enlargement unit 150 enlarges the simulated image of the vehicle at an enlargement factor of 1.1 in step S1112. On the other hand, when it is determined in step S1111 that the cumulative danger level index Point is not smaller than the threshold value A, the determination unit 140 notifies the image enlargement unit 150 of a determination result "high danger level" and the image enlargement unit 150 enlarges the simulated image of the vehicle at an enlargement factor of 1.15 in step S1113. In this embodiment, although the simulated image of a vehicle is enlarged in accordance with a cumulative danger level index, the simulated images of a vehicle corresponding to cumulative danger level indices may be stored in advance.

According to the second embodiment, it is possible to provide a driving support system capable of, even if a driver is accustomed to a warning generated by the driving support system, reducing a risk generated by an erroneous belief of the driver based on a past experience or a sense of safety given by the fact that the driver can check an out-of-view area. Furthermore, since a driving danger level is determined with a cumulative danger level index calculated on the basis of not only the distance to an obstacle but also the driving sate of a user's own vehicle, it is possible to provide a driving support system capable of more accurately reducing a risk generated by an erroneous belief of a driver.

[Third Embodiment]

Figure 12:
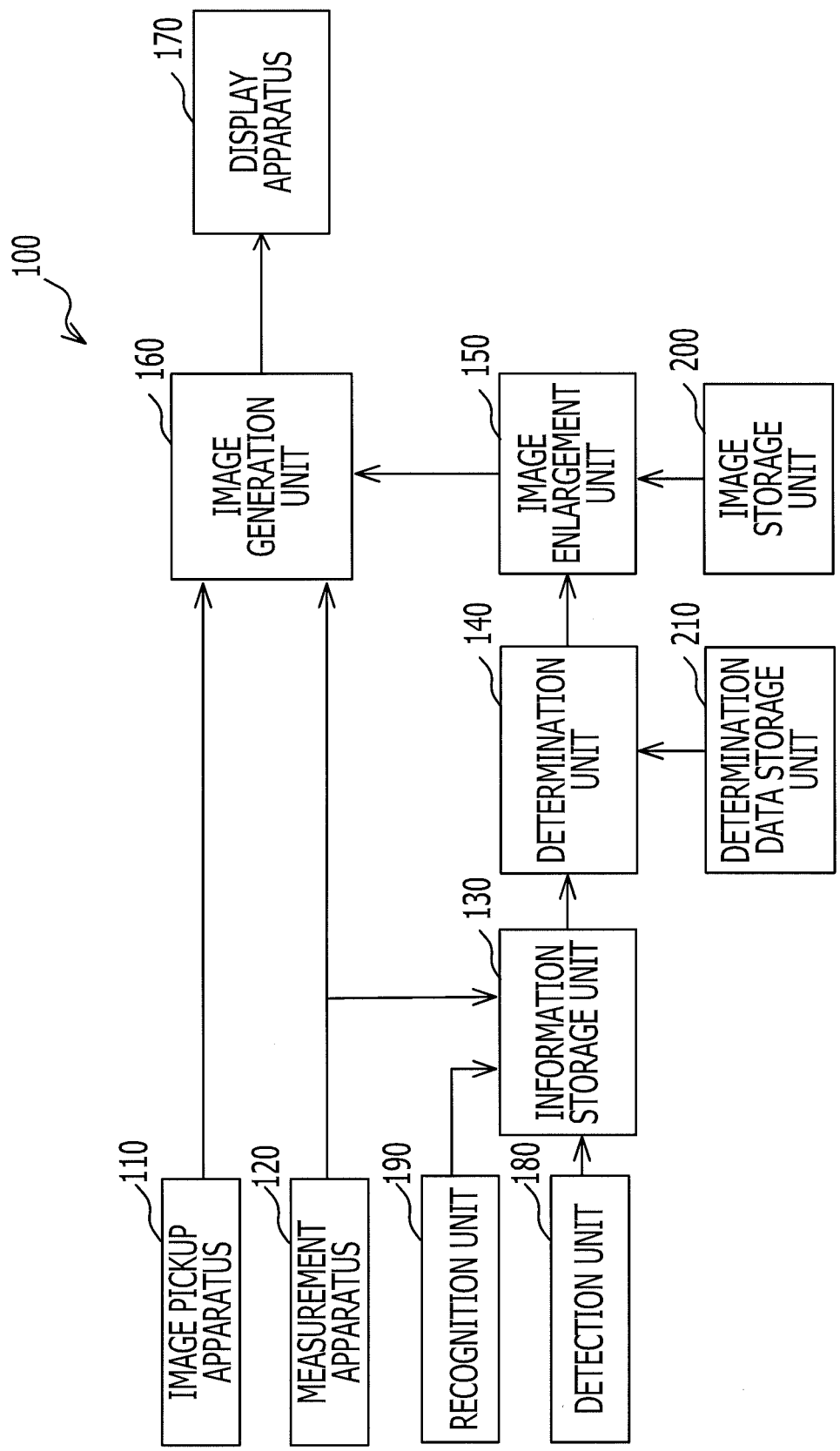
FIG. 12 is a block diagram illustrating the entire configuration of a driving support system according to a third embodiment.

The driving support system 100 according to the third embodiment will be described below with reference to the accompanying drawings. The description of the configuration of the driving support system 100 similar to that described in the first and second embodiments will be omitted. The driving support system 100 according to the third embodiment differs from that according to the first and second embodiments in that a recognition unit 190 illustrated in FIG. 12 is included.

Figure 13A:
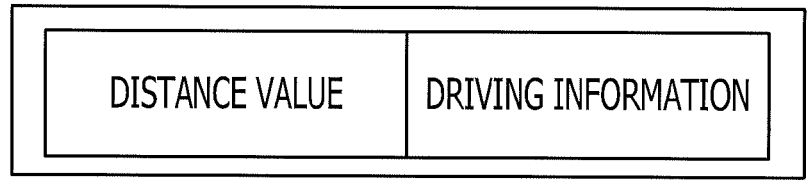
FIG. 13A is a diagram illustrating an exemplary format of data stored in an information storage unit.
Figure 13B:
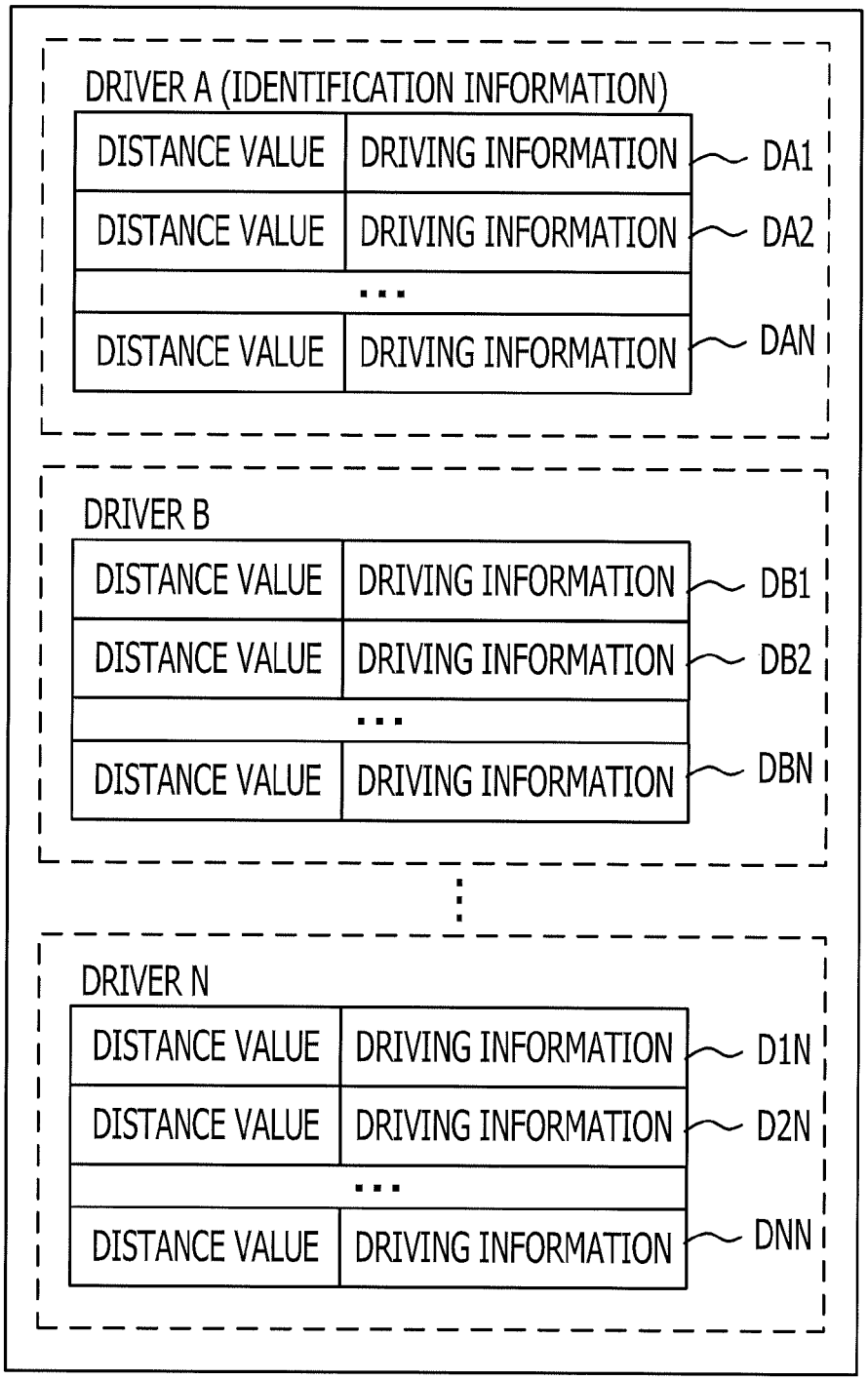
FIG. 13B is a diagram illustrating an example of data stored in an information storage unit.

Upon receiving pieces of driver identification information, distance values representing the distances to an obstacle, and pieces of driving information from the recognition unit 190, the measurement apparatus 120, and the detection unit 180, respectively, the information storage unit 130 stores the distance values and the pieces of driving information for each driver in chronological order as illustrated in FIG. 13B in a data format illustrated in FIG. 13A in which a distance value and driving information are associated with each other. For example, the information storage unit 130 stores pieces of data DA1 to DAN for a driver A, pieces of data DB1 to DBN for a driver B, and pieces of data DN1 to DNN for a driver N. Each of these pieces of data is obtained by associating a distance value and driving information with each other.

Figure 14:
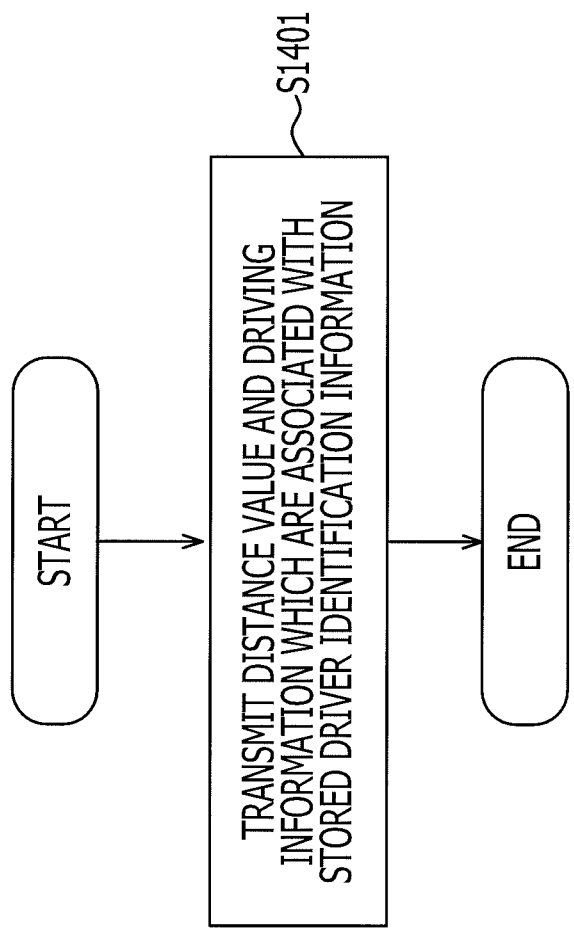
FIG. 14 is a flowchart illustrating the information transmission operation of an information storage unit.

Upon receiving an information reading request from the determination unit 140 as illustrated in FIG. 14, the information storage unit 130 transmits to the determination unit 140 a distance value and driving information which are associated with identification information of a driver who is performing a driving operation at that time.

The above-described driving support system may further include the recognition unit 190 for detecting the identification information of a driver who is driving a vehicle. The information storage unit 130 may associate the driver with information about the distance to an obstacle and driving information and store them. It is desirable that the determination unit 140 read out the information about the distance to an obstacle and the driving information which are associated with the driver recognized by the recognition unit 190 from the information storage unit 130 and determine the driving danger level of the driver on the basis of the read pieces of information.

According to the above-described configuration, since the driving danger level of a recognized driver is determined, it is possible to provide a driving support system capable of more accurately reducing a risk generated by an erroneous belief of each driver.

[First Modification]

Figure 15:
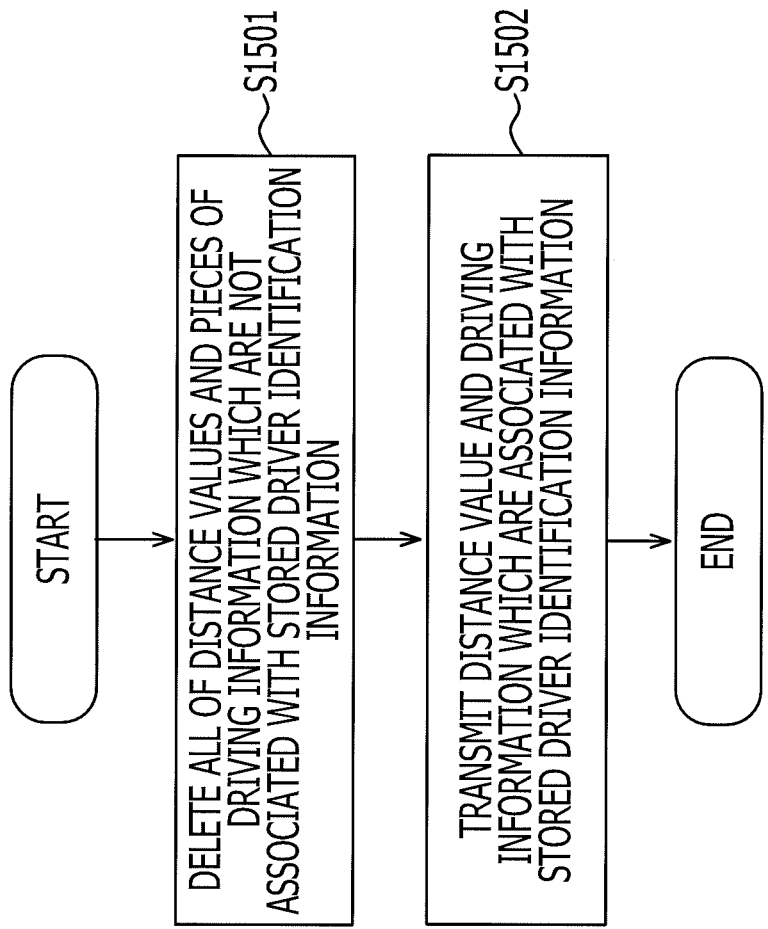
FIG. 15 is a flowchart illustrating the information transmission and deletion operation of an information storage unit.

As illustrated in FIG. 15, upon receiving an information reading request from the determination unit 140, the information storage unit 130 deletes all of distance values and pieces of driving information which are not associated with the identification information of a driver who is performing a driving operation at that time, and transmits a distance value and driving information which are associated with the identification information of the driver to the determination unit 140. As a result, since only information associated with a recognized driver is stored, it is possible to effectively use a memory.

[Second Modification]

As illustrated in FIG. 16, upon receiving an information reading request from the determination unit 140, the information storage unit 130 transmits a distance value and driving information which are associated with the identification information of a driver who is performing a driving operation at that time to the determination unit 140, and deletes all of the distance value and the driving information which are associated with the identification information of the driver. As a result, since information that has been read from a memory can be deleted, it is possible to effectively use the memory.

The above-described embodiments can be combined as long as there is no inconsistency. An embodiment of the present invention is also achieved when a program of software that implements the above-described embodiments, that is, a program corresponding to an illustrated flowchart, is supplied to an apparatus and a computer included in the apparatus reads out the supplied program and executes the read program. Accordingly, a program itself that is installed on a computer so as to cause the computer to achieve functional processing described in the above-described embodiments is considered as an embodiment of the present invention.

A driving support system has been described in the above-described embodiments. However, a driving support apparatus configured to display an image on a display apparatus for a car navigation system connected thereto, obtain distance information from another measurement apparatus, and acquire the image of the periphery of a user's own vehicle from another image pickup apparatus is considered as an embodiment of the present invention. The configurations described in the above-described embodiments are merely intended to illustrate specific examples and not to limit the technical scope of the present invention. Any configuration can be adopted within a scope in which the above-described effects are achieved.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal. The media described above may be non-transitory media.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

The invention claimed is:

1. A driving support system, comprising:
   an image pickup apparatus configured to capture an image of a periphery of a vehicle in which the image pickup apparatus is provided;
   a measurement apparatus configured to measure a distance from the vehicle to an obstacle around the vehicle;
   a driving support apparatus, the driving support apparatus including:
      a determination unit configured to determine a driving danger level of a driver of the vehicle based on the distance measured by the measurement apparatus,
      an image enlargement unit configured to change a size of a simulated image of the vehicle stored in advance based on a result of determination by the determination unit, and
      an image generation unit configured to combine the image of the periphery of the vehicle and the simulated image of the vehicle changed by the image enlargement unit; and
   a display apparatus configured to display the image combined by the image generation unit.

2. A driving support apparatus capable of cooperatively operating with an image pickup apparatus configured to capture an image of a periphery of a vehicle in which the image pickup apparatus is provided, a measurement apparatus configured to measure a distance from the vehicle to an obstacle around the vehicle, and a display apparatus configured to display an image, comprising:
- an image storage unit configured to store a simulated image of the vehicle;
- a determination unit configured to determine a driving danger level of a driver of the vehicle based on the distance measured by the measurement apparatus;
- an image enlargement unit configured to change a size of the simulated image of the vehicle based on a result of determination by the determination unit; and
- an image generation unit configured to combine the image transmitted from the image pickup apparatus and the simulated image of the vehicle changed by the image enlargement unit, and output the combined image to the display apparatus.

3. The driving support apparatus according to claim 2, further comprising:
- an information storage unit configured to store a plurality of distances from the vehicle to the obstacle and a plurality of danger level indexes associated with each other,
- wherein the determination unit refers to the information storage unit, reads out the danger level index associated with the distance measured by the measurement apparatus, and determines the driving danger level of the driver with the danger level index.

4. The driving support apparatus according to claim 2, further comprising:
- an information storage unit configured to store a plurality of distances from the vehicle to the obstacle and a plurality of danger level indexes associated with each other,
- wherein the determination unit refers to the information storage unit based on a plurality of values representing distances which have been chronologically measured by the measurement apparatus, calculates a cumulative danger level index by adding a danger level index corresponding to one of the plurality of values obtained in certain measurement to a danger level index corresponding to another one of the plurality of values obtained in measurement prior to the certain measurement, and determines the driving danger level of the driver based on the cumulative danger level index.

5. The driving support apparatus according to claim 2, further comprising:
- a detection unit configured to acquire driving information indicating a driving state of the vehicle; and
- an information storage unit configured to store a plurality of driving information, a plurality of distances from the vehicle to the obstacle, and a plurality of danger level indexes associated with one another,
- wherein the determination unit refers to the information storage unit, reads out the danger level index associated with the driving information acquired by the detection unit and the distance measured by the measurement apparatus, and determines the driving danger level of the driver with the danger level index.

6. The driving support apparatus according to claim 5, wherein the detection unit acquires a speed of the vehicle.

7. The driving support apparatus according to claim 5, further comprising:
- a recognition unit configured to acquire identification information of a driver who drives the vehicle;
- a second information storage unit configured to store a plurality of distances measured by the measurement apparatus, a plurality of driving information acquired by the detection unit, and a plurality of the identification information of the driver acquired by the recognition unit associated with one another,
- wherein the determination unit refers to the second information storage unit, reads out the distance and the driving information associated with the identification information of the driver recognized by the recognition unit, and determines the driving danger level of the driver based on the read distance and the read driving information.

8. The driving support apparatus according to claim 7, wherein, when the recognition unit recognizes the identification information of the driver, the second information storage unit deletes data that is not associated with the identification information of the driver.

9. The driving support apparatus according to claim 7, wherein, when the determination unit reads out the distance and the driving information which are associated with the identification information of the driver from the second information storage unit, the second information storage unit deletes the read information.

10. The driving support apparatus according to claim 2, further comprising:
- a detection unit configured to acquire driving information indicating a driving state of the vehicle; and
- an information storage unit configured to store a plurality of driving information, a plurality of distances from the vehicle to the obstacle, and a plurality of danger level indexes associated with one another,
- wherein the determination unit refers to the information storage unit based on pieces of driving information acquired by the detection unit and a plurality of values representing distances to the obstacle which have been chronologically measured by the measurement apparatus, calculates a cumulative danger level index by adding a danger level index corresponding to one of the pieces of driving information and one of the plurality of values which have been obtained in certain measurement to a danger level index corresponding to another one of the pieces of driving information and another one of the plurality of values which have been obtained in measurement prior to the certain measurement, and determines the driving danger level of the driver based on the cumulative danger level index.

11. The driving support apparatus according to claim 10, wherein the detection unit acquires a speed of the vehicle.

12. A driving support method executed by a computer, comprising:
- determining a driving danger level of a driver who drives a vehicle based on a distance from the vehicle to an obstacle measured by a measurement apparatus;
- changing a size of a simulated image of the vehicle stored in an image storage unit in advance based on the driving danger level determined by the determining; and
- combining an image captured by an image pickup apparatus provided in the vehicle and the simulated image of the vehicle whose size has been changed, and outputting the combined image to a display apparatus.

13. The driving support method according to claim 12, wherein, in the determining, an information storage unit stores a plurality of distances from the vehicle to the obstacle and a plurality of danger level indexes associated with each other is referred based on a plurality of values representing distances to the obstacle which have been chronologically measured by the measurement apparatus, a cumulative danger level index is calculated by adding a danger level index corresponding to one of the plurality of values obtained in certain measurement to a danger level index corresponding to another one of the plurality of values obtained in measurement prior to the certain measurement, and the driving danger level of the driver is determined based on the cumulative danger level index.

14. The driving support method according to claim 12, wherein, in the determining, an information storage unit stores a plurality of driving information indicating a driving state of the vehicle, a plurality of distances from the vehicle to the obstacle, and a plurality of danger level indexes associated with one other is referred, the danger level index associated with the driving information acquired by a detection unit and the distance measured by the measurement apparatus is read, and the driving danger level of the driver is determined based on the danger level index.

15. A non-transitory computer-readable medium for recording a program allowing a computer to execute:
   determining a driving danger level of a driver who drives a vehicle based on a distance from the vehicle to an obstacle measured by a measurement apparatus;
   changing a size of a simulated image of the vehicle stored in an image storage unit in advance based on the driving danger level determined by the determining; and
   combining an image captured by an image pickup apparatus provided in the vehicle and the simulated image of the vehicle whose size has been changed and outputting the combined image to a display apparatus.

16. The computer-readable medium for recording a program according to claim 15, wherein, in the determining, an information storage unit stores a plurality of distances from the vehicle to the obstacle and a plurality of danger level indexes associated with each other is referred based on a plurality of values representing distances to the obstacle which have been chronologically measured by the measurement apparatus, a cumulative danger level index is calculated by adding a danger level index corresponding to one of the plurality of values obtained in certain measurement to a danger level index corresponding to another one of the plurality of values obtained in measurement prior to the certain measurement, and the driving danger level of the driver is determined based on the cumulative danger level index.

17. The computer-readable medium for recording a program according to claim 15, wherein, in the determining, an information storage unit stores a plurality of driving information indicating a driving state of the vehicle, a plurality of distances from the vehicle to the obstacle, and a plurality of danger level indexes associated with one other is referred, the danger level index associated with the driving information acquired by a detection unit and the distance measured by the measurement apparatus is read, and the driving danger level of the driver is determined based on the danger level index.

* * * * *